United States Patent [19]
Zetterlund

[11] 3,750,593
[45] Aug. 7, 1973

[54] TOW VEHICLE WITH ANTI-BACK UP WHEELS

[75] Inventor: Stanley L. Zetterlund, Easton, Pa.

[73] Assignee: SI Handling Systems, Inc., Easton, Pa.

[22] Filed: Mar. 8, 1971

[21] Appl. No.: 121,637

[52] U.S. Cl. .................... 104/172 BT, 188/82.84
[51] Int. Cl. .................... B65g 17/42, F16d 63/00
[58] Field of Search .................... 104/172 BT; 188/82.84

[56] References Cited
UNITED STATES PATENTS

| R25,723 | 2/1965 | Bradt et al. | 104/172 BT |
| 2,962,128 | 11/1960 | Luenberger | 188/82.84 |
| 3,436,994 | 4/1969 | Diener et al. | 188/82.84 |
| 3,528,534 | 9/1970 | Benson et al. | 188/82.84 |
| 2,619,370 | 11/1952 | Leger | 104/172 BT |
| 3,094,944 | 6/1963 | Bradt et al. | 104/172 BT |
| 3,119,347 | 1/1964 | Dehne | 104/172 BT |
| 3,427,992 | 2/1969 | Jones et al. | 104/172 BT |
| 3,589,301 | 6/1971 | Reagan | 104/172 BT |
| 3,236,337 | 2/1966 | Marland et al. | 188/82.84 |
| 3,542,160 | 11/1970 | Sacchini | 188/82.84 |

*Primary Examiner*—Drayton E. Hoffman
*Attorney*—Seidel, Gonda & Goldhammer

[57] ABSTRACT

A tow vehicle adapted to be guided for movement along a slot is provided with swivel castor wheels at the front end of the vehicle. The front castor wheels are provided with roller clutch bearings which act as a brake to prevent the vehicle from being moved in a rearward direction.

3 Claims, 4 Drawing Figures

PATENTED AUG 7 1973

3,750,593

INVENTOR
STANLEY L. ZETTERLUND

BY
Seidel, Gonda & Goldhammer
ATTORNEYS

TOW VEHICLE WITH ANTI-BACK UP WHEELS

The present invention is directed to a tow vehicle, and more particularly, to a tow vehicle having anti-back up wheels. A large number of tow vehicles have been proposed heretofore. Such vehicles are provided with a tow pin or guide members which cooperate with a slot or some other track to guide the vehicle as it is propelled along the slot.

Heretofore, tow vehicles of the type involved in the present invention have been provided with a brake means cooperating with the rear wheels of the vehicle to prevent the vehicle from being moved in a rearward direction. A brake means for accomplishing this is needed in connection with tow vehicles so that the vehicle does not move rearwardly when it contacts an obstruction. Also, it is often desirable to cause the vehicles to accumulate, that is, selectively lose contact with its propelling means. When accumulating, a cart tends to recoil and roll backwards. This will allow the bumper to disengage whereby the tow pin will drop and re-engage with the conveyor. This is prevented by the present invention. If accumulated vehicles are on a slight incline, they tend to roll rearwardly due to gravity and this is prevented by the present invention.

A wide variety of devices for applying a brake to the rear wheels of the tow vehicle has been proposed heretofore. For example, see U. S. Pat. Nos. 2,619,370; 3,427,992; 3,119,347; 3,094,944; and Re. 25,723. In these patents, a brake for the rear wheels is responsive to movement of an accumulation bumper.

The present invention is directed to a vehicle which is provided with an anti-back up means, namely a means to prevent the vehicle from being moved rearwardly parallel to the main slot. However, the present invention accomplishes this in a novel manner which is substantially less expensive than those proposed heretofore. At the same time, the present invention eliminates maintenance needed to adjust the cables and rear brakes utilized heretofore. Further, the present invention eliminates the need for a ledge on the rear of the vehicle, thereby enabling an accumulation bumper to be pivoted or hinged from above rather than below. An accumulation bumper which is hinged from above is easier to activate, requires less force to activate and lift the tow pin, and can permit accumulation by contact with any obstacle.

In accordance with the present invention, the front wheels of the vehicle are swiveled castors. Each of the front wheels is provided with roller clutch bearings which only permit the front wheels to rotate in one direction, namely the direction whereby the vehicle will move forwardly. The roller clutch bearings on the front wheel automatically brake the front wheels in the event that the vehicle is moved in a rearward direction parallel to the main slot and one independent of any accumulation bumper.

It is an object of the present invention to provide a tow vehicle with brake means to prevent the vehicle from moving in a rearward direction.

It is another object of the present invention to provide a tow vehicle having brake means to prevent the vehicle from moving in a rearward direction, with the brake means being part of the front swivel castors.

It is another object of the present invention to provide a tow vehicle with brake means to prevent the vehicle from moving rearwardly, the same being accomplished in a manner which is inexpensive, reliable, and substantially reduces maintenance.

It is another object of the present invention to provide a tow vehicle which is provided with a brake means to prevent the vehicle from moving in a rearward direction while eliminating the need for a rear ledge and facilitating the use of an accumulation bumper which is hinged at its upper end.

Other objects will appear hereinafter.

For the purpose of illustrating the invention, there is shown in the drawings a form which is presently preferred; it being understood, however, that this invention is not limited to the precise arrangements and instrumentalities shown.

Figures 1, 2, 3, 4:
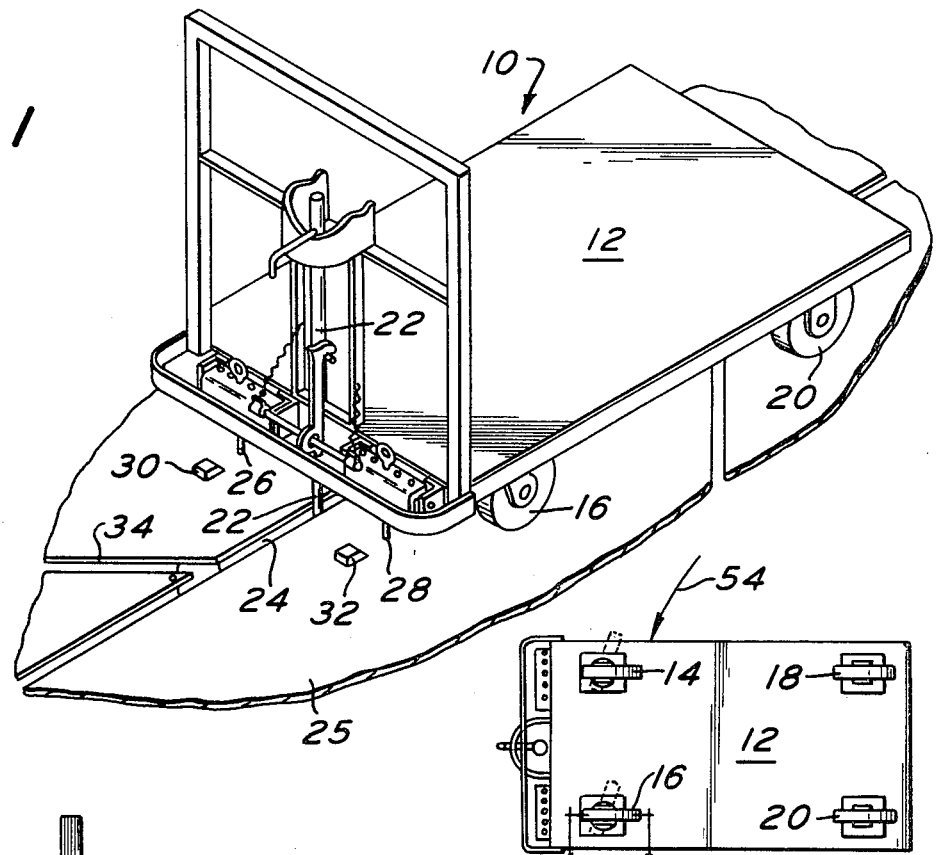
FIG. 1 is a perspective view of a typical vehicle incorpoating the present invention.
FIG. 2 is a bottom plan view of the vehicle shown in FIG. 1, but on a smaller scale.
FIG. 3 is a sectional view taken through the bearing of a front castor wheel along line 3—3 in FIG. 2, but on an enlarged scale.
FIG. 4 is a side elevation view of the vehicle shown in FIG. 1.

Referring to the drawing in detail, wherein like numerals indicate like elements, there is shown in FIG. 1 a tow vehicle in accordance with the present invention designated generally as 10. The structural details of the vehicle 10, except for the front wheels, are conventional and will only be referred to briefly.

The vehicle 10 includes a base 12 mounted on front swivel castor wheels 14 and 15 and rear wheels 18 and 20. The vehicle 10 includes an upright frame at the front end thereof supporting a vertically disposed tow pin 22.

The tow pin 22 is adapted to enter the main slot 24 in a reference surface such as floor 25. Tow pin 22 cooperates with the main slot 24 for guiding the vehicle 10 therealong and at its lower end is adapted to engage a propelling means such as a conveyor. Contact between the tow pin and the propelling means causes the vehicle 10 to move along the main slot 24.

In large tow vehicle systems, it is often desirable or necessary to cause the vehicles 10 to accumulate. Accumulation involves causing the tow pin to lose contact with the propelling conveyor means. This may be accomplished in a variety of ways. Most conventional tow vehicles cause accumulation by utilizing an accumulation bumper which when moved will raise the tow pin 22 so that it is no longer in contact with the propelling conveyor means.

In a typical tow vehicle system, it is often desirable to cause the vehicle 10 to be transferred from movement along the main slot 24 to movement along a shunt slot which intersects the main slot at an acute angle. A typical shunt slot is identified by the numeral 34. The vehicle 10 may be provided with means to cause the tow pin 22 to transfer from movement along the main slot 24 to movement along the shunt slot 34. Such means may include selector rods 26 and 28 on the front end of the vehicle which are adapted to cooperate with abutments 30 and 32.

The vehicle 10 as described above is typical of a conventional commercially available vehicle and is described in greater detail in U. S. Pat. No. Re. 25,723. Hence, Further discussion of the details of the vehicle 10 is not deemed necessary. It is emphasized that the vehicle 10 as described above is merely illustrative of a wide variety of tow vehicles which may incorporate the means for preventing the vehicle from moving rearwardly in accordance with the present invention.

The truck wheels 14 and 16 are swivel castor wheels and may rotate about a vertical axis from the solid-line position to the phantom position shown in FIG. 2. Each of the front wheels 14 and 16 is identical. Accordingly, only wheel 16 will be described in detail.

As shown more clearly in FIG. 3, the inner rim 36 of the wheel 16 is spaced from the shaft 38. A brake means in the form of a roller clutch bearing designated generally as 40 is disposed in the gap between the inner periphery of rim 36 and the outer periphery of shaft 38. The roller clutch bearing 40 is preferably force-fit to the ID of the rim 36. If desired, the clutch 40 could be force-fit onto the shaft 38.

The roller bearing clutch 40 may include a cup-shaped housing having an outer race 42 and an inner race 44 connected together by an end wall 46. Needle roller bearings 47 extend parallel to the axis of shaft 48. If desired, ball bearings could be used.

As the wheels 16 rotate in a direction whereby the vehicle 10 moves in a forward direction, and counter-clockwise in FIG. 3, the needle bearings 47 move into the large space 50 while remaining in rolling contact with the outer periphery of shaft 38. If the vehicle 10 is in any way subjected to forces which tend to cause it to move in a rearward direction whereby-wheel 16 would rotate in the direction of arrow 48 in FIG. 3, the needle bearings 47 contact the inclined tapered surfaces 52 and act as a brake. The shafts 38 on the wheels 14 and 16 do not rotate.

It is appreciated that roller clutch bearings, per se, have been proposed heretofore and no claims to the bearings per se are made herein. If the roller clutch bearings 40 were utilized on the rear wheels 18 and 20, the vehicle 10 would be difficult to utilize since the tow vehicle must be moved manually to and from the main slot 24. By locating the roller clutch bearing 40 on the front wheels, the vehicle 10 may be manually moved by first applying a force in the direction of arrow 54 in FIG. 2 to cause the wheels 14 and 16 to swivel to the phantom positions illustrated therein. Thereafter, the vehicle can be moved in the direction of the wheels 14 and 16 so that it is possible to turn the vehicle around and facilitate manually moving the vehicle to the main slot.

Thus, the use of roller bearing clutches for the front castor wheels of an otherwise conventional truck solves the problem in a simple and reliable manner requiring virtually no maintenacne. Heretofore, this problem of vehicles accumulating behind other vehicles and then being re-engaged with the conveyor chain were solved in one of two ways. One method of solving this accumulation problem was to put a ledge on the rear of the vehicle so as to hold the accumulation bumper on the next adjacent vehicle up. Another method was to add exterior brakes to cooperate with the tread of the rear wheels and provide linkage whereby the brakes were responsive to movement of the accumulation bumper. Frequently a combination of both said conventional methods has been used.

Tow vehicles incorporating the anti-back up means in the front swivel castor wheels are generally not visible. Hence, those persons skilled in the art of tow vehicles when handling a vehicle in accordance with the present invention have been totally unaware that the vehicle includes a means to prevent it from moving backwards along a main slot.

The present invention may be embodied in other specific forms without departing from the spirit or essential attributes thereof and, accordingly, reference should be made to the appended claims, rather than to the foregoing specification as indicating the scope of the invention.

I claim:

1. A tow vehicle for use in a tow system wherein a vehicle is mounted for movement in the direction of a guide slot, said vehicle comprising a base, front and rear pairs of wheels supporting said base, said base having a guide means at the front end thereof for selective entry into a guide slot for guiding the base along the slot, said front pair of wheels being mounted for swiveling movement with respect to a generally vertical axis, said front wheels having brake means thereon for preventing the front wheels from rotating in a direction to cause the base to move rearwardly while the front and rear wheels are parallel to one another including rotatable clutch bearings surrounding the horizontally disposed shafts about which the front wheels rotate, each front wheel brake means including inner and outer races force-fit to the inner periphery of the rim on the front wheels, said bearings being cylindrical roller bearings in said races parallel to the axis of the front wheel shafts, the inner and outer races being constructed so as to enable the roller bearings to have a first position while the vehicle is moving in a forward direction and a second position when the vehicle is moving in a rearward direction, said outer bearing race having a tapered cam surface for preventing rotation of the roller bearings and front wheels in the second position of said bearings.

2. A tow vehicle for use in a tow system wherein driverless vehicles are mounted for movement in the direction of a guided path, said vehicle comprising a generally horizontal base, front and rear pairs of wheels supporting said base, said front wheels being mounted for swiveling movement with respect to a generally vertical axis, said front wheels having rotatable clutch bearings surrounding shafts of the front wheels for preventing the front wheels from rotating in a direction to cause the base to move rearwardly, each front wheel clutch bearing including inner and outer races force-fit to the inner periphery of the rim of the front wheels, roller bearings in said races parallel to the axis of the front wheel shafts, the inner and outer races being constructed so as to enable the roller bearings to have a first position while the vehicle is moving in a forward direction and a second position when the vehicle is moving in a rearward direction, said outer bearing race having a tapered cam surface for preventing rotation of the roller bearings and front wheels in the second position of said bearings.

3. A vehicle in accordance with claim 2 wherein said brake means is automatic and independent of the guide means and any bumper on the base.

* * * * *